United States Patent
Diller et al.

[11] Patent Number: 6,073,904
[45] Date of Patent: Jun. 13, 2000

[54] LATCHING COIL VALVE

[76] Inventors: Ronald G. Diller, 208 Nebraska St., Geneva, Ill. 60134; James M. Enger, 100 N. Salem Dr., Schaumburg, Ill. 60194; Kevin G. Nowobilski, 16701 S. Hilltop Ave., Orland Hills, Ill. 60477

[21] Appl. No.: 08/942,924

[22] Filed: Oct. 2, 1997

[51] Int. Cl.⁷ .................................................. F16K 31/40
[52] U.S. Cl. .......................................... 251/30.03; 251/65
[58] Field of Search .................................. 251/65, 30.02, 251/30.03, 30.04, 368; 137/549

[56] References Cited

U.S. PATENT DOCUMENTS

| | | | |
|---|---|---|---|
| 2,936,790 | 5/1960 | Dahl et al. | 251/30.03 X |
| 3,379,214 | 4/1968 | Weinberg | 251/65 X |
| 3,412,970 | 11/1968 | Robarge | 251/65 X |
| 3,735,772 | 5/1973 | Hunter et al. | 251/30.02 X |
| 4,175,590 | 11/1979 | Grandalement | 251/30.03 X |
| 4,470,030 | 9/1984 | Myers | 335/228 |
| 4,534,537 | 8/1985 | Zukausky | 251/30.03 |
| 4,630,799 | 12/1986 | Nolan et al. | 251/65 X |
| 4,649,360 | 3/1987 | Riefler et al. | 335/255 |
| 4,660,010 | 4/1987 | Burton | 335/228 |
| 4,778,227 | 10/1988 | Bayliss | 303/119 |
| 4,860,990 | 8/1989 | Fukuzawa et al. | 251/30.03 |
| 4,902,956 | 2/1990 | Sloan | 320/13 |
| 4,934,651 | 6/1990 | Nowicki | 251/65 X |
| 4,948,090 | 8/1990 | Chen | 251/65 X |
| 5,169,118 | 12/1992 | Whiteside | 251/30.03 |
| 5,244,179 | 9/1993 | Wilson | 251/30.03 |
| 5,447,286 | 9/1995 | Kamen | 251/30.02 |
| 5,538,026 | 7/1996 | Kazi | 137/1 |
| 5,558,127 | 9/1996 | Maruyama et al. | 137/636.1 |
| 5,584,465 | 12/1996 | Ochsenreiter | 251/65 |
| 5,603,355 | 2/1997 | Miyazoe et al. | 137/625.64 |
| 5,622,351 | 4/1997 | Kim | 251/65 X |
| 5,655,747 | 8/1997 | Pasut | 251/65 X |

FOREIGN PATENT DOCUMENTS

| | | | |
|---|---|---|---|
| 1952179 | 5/1970 | Germany | 251/65 |
| WO9423435 | 10/1994 | WIPO | 251/65 |

*Primary Examiner*—John Rivell
*Attorney, Agent, or Firm*—Terrence Martin; J. J. Morris; Sean Detweiler

[57] ABSTRACT

A latching coil valve device is provided, comprising a body providing an inlet and an outlet; an actuatable valve unit connecting said inlet to said outlet, and latching mechanisms for latching the actuatable valve unit in open or closed positions, respectively. The actuatable valve unit comprises a solenoid and a pilot operated valve comprising a primary valve member and a pilot valve member. The solenoid comprises a coil assembly and a plunger assembly. Energizing the coil of the solenoid moves the plunger to open and close the valve. The latching mechanism for latching the actuatable valve unit in the open position comprises a permanent magnet and the latching mechanism for latching the actuatable valve unit in the closed position comprises a coil spring. Only a momentary pulse of voltage needs to be applied to the coil of the solenoid in order open or close the valve. Once in the opened or closed positions, the permanent magnet or the coil spring, respectively, latches the valve. Means to tune the characteristics of the voltage pulse required to open and close the valve are provided by an adjustment mechanism for adjusting the position of the permanent magnet with respect to the plunger.

18 Claims, 2 Drawing Sheets

LATCHING COIL VALVE

FIELD OF THE INVENTION

The present invention relates generally to valves and more specifically to a pilot operated latching coil valve.

BACKGROUND OF THE INVENTION

Latching valves for controlling the flow of a liquid such as water are known. Typically in such a latching valve a solenoid is used to open and close the valve, and mechanical or magnetic means are used to latch the valve in open and closed positions. The solenoid, comprising a cylindrical plunger and a surrounding coil, is energized by introducing an electrical current in the coil to establish a magnetic field along the longitudinal axis of the plunger. The direction of the field depends upon the direction of current flow through the coil.

The plunger, under the influence of the axial magnetic field, moves in a direction along the lines of flux of the magnetic field. The direction of the lines of flux changes with the direction of the current through the coil. Accordingly, by reversing the polarity of the voltage applied to the ends of the coil, the direction of current through the coil, and thus the direction of the lines of flux and the movement of the plunger, may be reversed. Typically, one end of the plunger seats against a valve opening to provide a valve closed position, and moves away from the valve opening to provide a valve open position.

Latching means are provided to latch the position of the valve in either the open or closed positions. For example, a permanent magnet may be used to latch the valve in the open position while a spring may be used to latch the valve in the closed position. The magnet and the spring urge the plunger in opposite axial directions. An example of such a latching coil valve is shown in U.S. Pat. No. 5,584,465 to Ochsenreiter.

In Ochsenreiter, the closed position of the valve is changed to open by momentarily energizing the coil to create an axial magnetic force, in the direction opposite the spring force, which exceeds the spring force to move the plunger toward the permanent magnet. After the plunger moves to within close proximity of the permanent magnet, the coil may be deenergized because the force of the permanent magnet attracts the plunger to latch the valve in the open position. Conversely, the open position of the valve is changed to closed by momentarily energizing the coil to create an axial magnetic force, in the direction opposite the permanent magnet force, which reduces the permanent magnet force sufficiently to move the plunger in the same direction as the spring force. After the plunger has been moved a sufficient distance from the permanent magnet, the coil may be deenergized because the force of the spring urges the plunger to latch the valve in the closed position. Thus, the magnetic force provided by the coil is used only to bias the forces of either the magnet or the spring, in the open and closed valve positions, respectively, so that the other of the magnet or the spring may latch the valve in the appropriate position.

The Ochsenreiter latching coil valve, however, suffers from at least two identifiable drawbacks. First, in order to assure that the valve may operate consistently during valve opening and closing operations, the coil must be provided with a sufficient amount of current to assure that the developed axial magnetic force is always sufficient to overcome the force of the permanent magnet which latches the valve in the open position (to close the valve), or the force of the spring which latches the valve in the closed position (to open the valve). However, it is difficult to determine the precise amount of force required to be developed due to variances in the force of the permanent magnet and of the spring, and variances in coil constructions. Accordingly, a voltage must be applied across the coil leads sufficient to develop a magnetic force which is greater than that of either the spring or the permanent magnet.

In addition, the Ochsenreiter valve, being a direct acting valve, is not suitable for high flow applications of, for example, greater than one gallon per minute. Pilot operated valves for use in applications of several gallons per minute are known, as shown in U.S. Pat. No. 5,538,026 to Kazi. Pilot valves such as Kazi typically include a pilot valve member and a main valve member. To open the valve, the pilot valve member moves into the open position and the hydraulic force of the fluid forces the main valve member open. With the main valve member open, greater fluid flow from the inlet to the outlet is obtainable than would otherwise be attained if only the pilot valve member communicated between the inlet and the outlet. Kazi, however, does not provide means for latching the valve in the open and closed positions.

Accordingly, it is an object of the present invention to provide a pilot operated valve which can be latched in both the open and closed positions.

It is a further object of the present invention to provide a latching coil valve having means for latching which are adjustable so that the valve may be efficiently operated despite manufacturing variances in the latching means and the coil.

SUMMARY OF THE INVENTION

A latching coil valve device is provided, comprising a body providing an inlet and an outlet, an actuatable valve unit connecting the inlet to the outlet, and latching mechanisms for latching the actuatable valve unit in open or closed positions, respectively. The actuatable valve unit comprises a solenoid and a pilot operated valve comprising a primary valve member (or diaphragm) and a pilot valve member. The solenoid comprises a coil assembly and a plunger assembly. Energizing the coil of the solenoid moves the plunger to open and close the valve.

The latching mechanism for latching the actuatable valve unit in the open position comprises a permanent magnet and the latching mechanism for latching the actuatable valve unit in the closed position comprises a coil spring. Only a momentary pulse of voltage needs to be applied to the coil of the solenoid in order open or close the valve. Once in the opened or closed positions, the permanent magnet or the coil spring, respectively, latches the valve. Means to tune the characteristics of the voltage pulse required to open and close the valve are provided by an adjustment mechanism for adjusting the position of the permanent magnet with respect to the plunger. In the preferred embodiment, the adjustment mechanism comprises a threaded setscrew to which the permanent magnet is magnetically attached.

DETAILED DESCRIPTION OF A PREFERRED EMBODIMENT OF THE INVENTION

Figure 1:
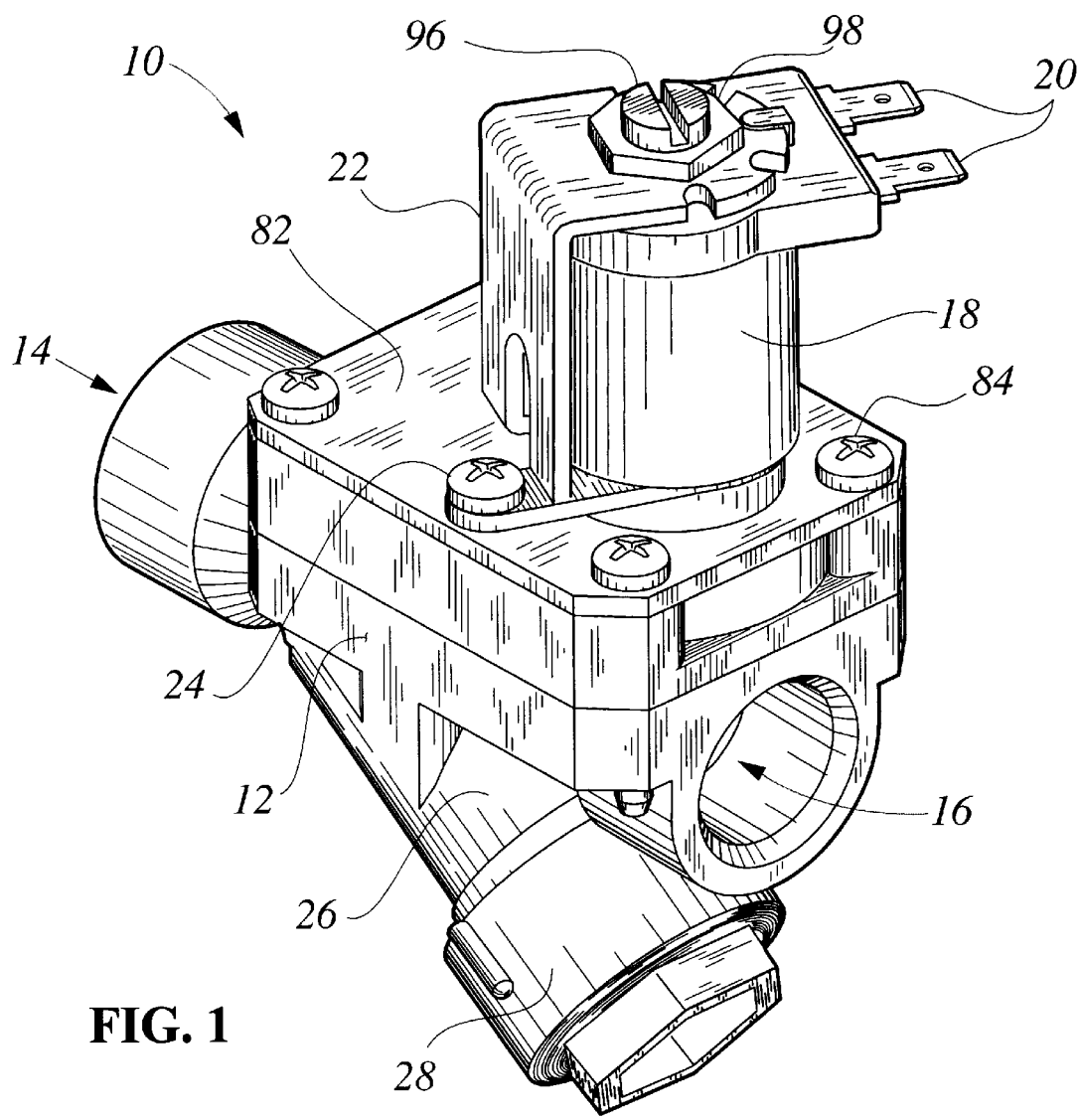
FIG. 1 is a perspective view of a pilot operated latching coil valve constructed according to the principles of the present invention.

Referring now to the drawings, and specifically to FIG. 1, the latching coil valve 10 comprises a body 12 having an inlet 14 and an outlet 16. The body 12 may be molded from a thermoplastic material, or may be made of a metallic material such as brass, or any other suitable material.

Figure 2:
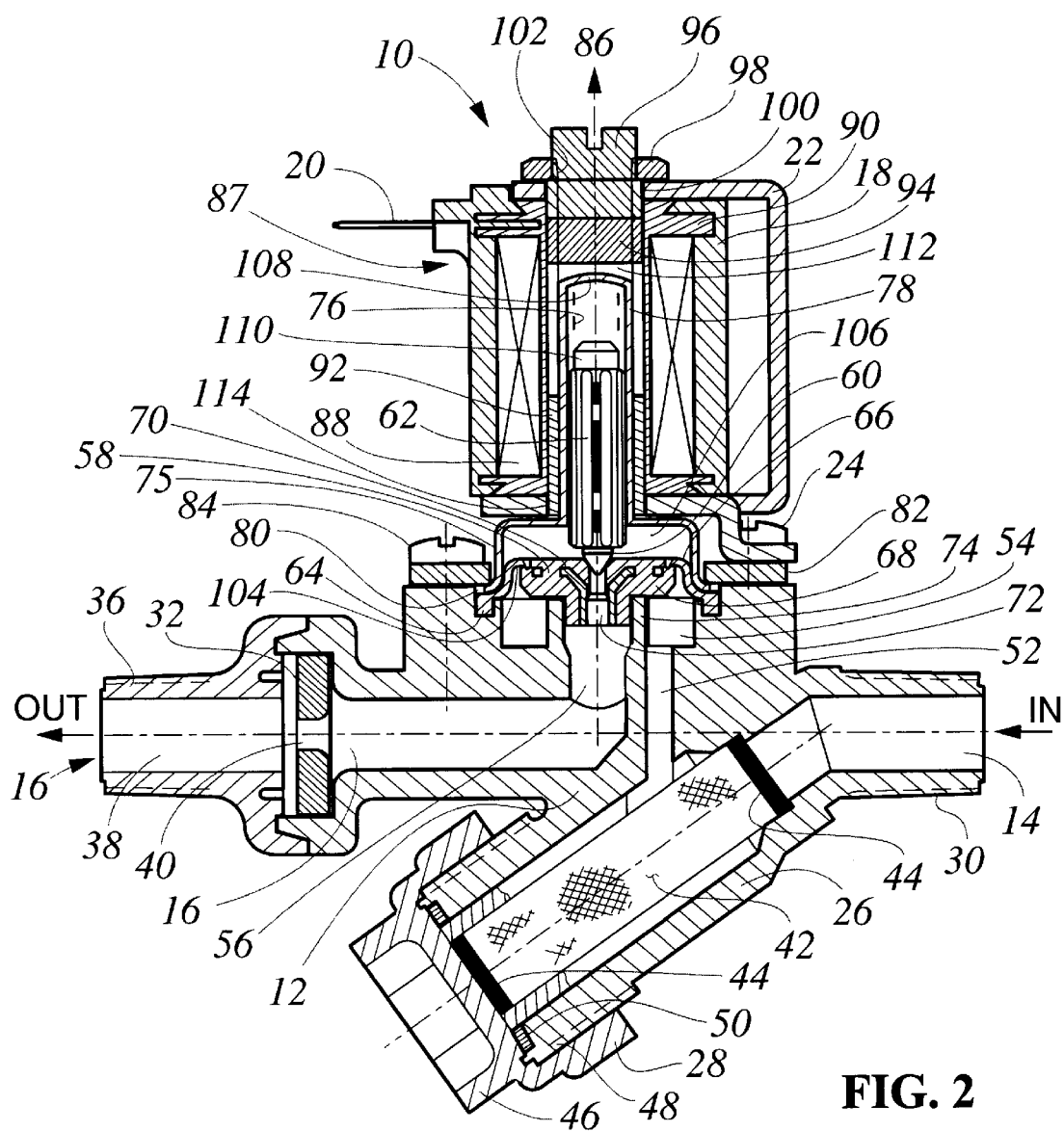
FIG. 2 is a side sectional view of a pilot operated latching coil valve constructed according to the principles of the present invention.

A coil housing 18 contains a coil (see FIG. 2) which operates a plunger (FIG. 2) to open and close the valve 10. The coil is energized through electrical leads 20, and is secured to the body by means of a C-shaped bracket 22 and fastener 24. Latching means, also shown in FIG. 2, are provided to latch the valve in the open and closed positions. Fluid (such as water) flow controlled by the valve is filtered on the inlet side of the valve by a filter (FIG. 2) contained by filter housing 26 and secured into position by an end cap 28.

FIG. 2 is a sectional view of a valve 10 similar to that shown in FIG. 1, showing minor modifications to the inlet and outlet 14 and 16, respectively. In FIG. 2, the valve inlet 14 is provided with a threaded male fitting 30, rather than a female fitting as shown in FIG. 1. Valve outlet 16 is provided with a flow-regulating washer 32, which is fixed into position within the outlet by extension member 36. Extension member 36 is spun welded to the outlet 16. Accordingly, fluid flow through an extension outlet 38 is regulated by the amount of fluid permitted to flow through a central aperture 40 in the flow-regulating washer 32.

Fluid flowing through the inlet 14 passes through a cylindrical filter or screen 42 located within filter housing 26. End rings 44 that are integral with the screen provide rigidity to the screen structure. The screen may be removed and replaced by removing the end cap 28, which is provided with a hexagonal nut fitting 46 and threads 48. An O-ring 50 seals the interface between the end cap 28 and the filter housing 26.

With the screen in place, fluid flows from the inlet 14 through the screen 42 and into vertical channel 52 and horizontal annular channel 54. Channels 52 and 54 comprise the latter stages of the fluid inlet path, and are separated from a central orifice 56 of the outlet 16 by a primary valve member (or diaphragm) 58 and a pilot valve member 60. The pilot valve member is part of plunger 62, which in turn is part of the solenoid described in further detail below.

The diaphragm 58 is comprised of an elastomeric material and is generally circular in shape. The outer circumference of the diaphragm 58 comprises a substantial anchoring portion 64, which seats into a correspondingly shaped channel in the body 12. Extending radially inward from the outer circumference is a webbed portion 66 of the diaphragm 58, which connects the anchoring portion 64 with a central portion 68. The central portion 68 diaphragm is provided with a plated brass bushing 70 which in part forms central portion opening 72. When in the closed position, as shown in FIG. 2, the central portion 68 of the primary valve member 58, in conjunction with the pilot valve member 60, form the seal which isolates the annular chamber 54 (inlet) from the central orifice 56 of the outlet 16. The central portion 68 rests upon wall 74 that separates the annular chamber 54 (inlet) from the central orifice 56 of the outlet 16.

A plunger assembly 75, comprising plunger 62 and a coil spring 76 disposed within a non-magnetic guide tube 78 (for example stainless steel) resides above the diaphragm 58. The diaphragm 58 (at the location of the anchoring portion 64) and the plunger assembly 75 (at the location of flange 80 on guide tube 78) are fixedly attached to the valve body 12 by means of plate 82 and fasteners 84. Although screws are shown as fasteners 24 and 84, any suitable fasteners may be utilized in the construction of the valve 10.

The plunger moves axially and vertically along axis 86 under the influence of a magnetic field which is developed by a coil assembly 87 which surrounds the guide tube 78 of the plunger assembly. Together, the plunger assembly 75 and the coil assembly 87 form a solenoid which is responsible for actuating (opening and closing) the valve 10. The coil assembly 87 comprises a wire wound coil 88, which is wound upon a bobbin 90 and surrounded by coil housing 18. Together, the plunger assembly 75, the coil assembly 87, and the valve formed by primary valve member 58 and pilot valve member 60 comprise an actuatable valve unit which connects the inlet 14 to the outlet 16.

A metallic inner sleeve or pole piece 92 is disposed between the bobbin 90 and the guide tube 78 of the plunger assembly, pressed fit into the C-shaped bracket 22. The pole piece serves to fix the position of the coil assembly within the C-shaped bracket. Above the guide tube 78 is disposed a permanent magnet 94 the axial position of which is adjustable along axis 86 by means of setscrew 96 and locking nut 98. Set screw 96 threads into corresponding threads 100 in the C-shaped bracket. Locking nut 98 threads into corresponding threads 102 on the outside of setscrew 96. The permanent magnet is attracted to the setscrew 96 and thus moves therewith. Bracket 22, having the coil assembly fixedly secured thereto by the pole piece 92, is attached to the plate 82, and hence the valve body 12, by means of fastener 24.

Operation of the inventive valve 10 is as follows. When in the closed position, as shown in FIG. 2, the central portion 68 of the primary valve member (diaphragm) 58 rests on wall 74, and pilot valve member 60 closes the central portion opening 72. The valve is closed because central orifice 56 (outlet) is isolated from the horizontal annular chamber 54 (inlet). A pair of bleed holes 104 are formed in the webbed portion 66 of the diaphragm 58. The bleed holes permit fluid to pass from the chamber 54 to an internal cavity 106 of the guide tube 78. As such, in the closed position, pressure is equalized on both sides of the webbed portion of the diaphragm (equal pressures in chamber 54 and cavity 106). The valve is latched in the closed position by means of the coil spring 76 which exerts pressure on the inside of the top end 108 of the guide tube, on one end, and on the top end 110 of the plunger 62.

The valve is opened by conventional means as is known in the art. A voltage is momentarily applied to electrical leads 20 to induce an electrical current in the coil and a resulting magnetic field having flux lines parallel to the axis 86. The force of the flux lines is sufficient to overcome the force of the coil spring 76 and the plunger moves upward along axis 86. The valve is latched in the open position by permanent magnet 94 which attracts the top end 110 of the plunger 62 (the force of the magnet on the plunger, at this plunger location, is greater than the opposing force of the spring). Thus, power need not be continually applied to the coil to maintain the valve in the open position.

When the plunger is raised, the seal between the pilot valve member 66 and the diaphragm central opening 72 is broken. Fluid immediately flows from cavity 106 down through the opening 72, creating a pressure differential between chamber 54 and cavity 106, on either side of the webbed portion of the diaphragm. This resulting pressure differential causes the higher pressure fluid in cavity 54 to lift the diaphragm central portion 68 from its seat on wall 74 (the webbed portion 66 flexes). Accordingly, significant volumes of fluid may pass through the pilot operated valve 10 in the open position.

To close the valve, a voltage (of opposite polarity than that used to open the valve) is momentarily applied to electrical leads 20 to induce an electrical current in the coil and a resulting magnetic field having flux lines parallel to the axis 86 (though in a direction opposite in polarity to the flux lines generated during the valve opening process). The force of the flux lines is sufficient to overcome the force difference between the permanent magnet 94 and the spring 76, and the plunger moves downward along axis 86. The valve is latched in the closed position by coil spring 78 which forces the pilot valve member into the diaphragm central opening 74 (the force of the spring on the plunger, at this plunger location, is greater than the opposing force of the magnet). Thus, power need not be continually applied to the coil to maintain the valve in the closed position.

Operational characteristics of the valve 10 are as follows. The operating voltage of the coil is approximately +/−6–9 volts DC; the coil resistance is approximately 6.0 ohms at 25° C.; the operating pressure range is approximately 15–160 pounds per square inch (psi); the water temperature range is approximately 40–160° F.; and the flow rate is approximately 4.3 gallons per minute (gpm) at 20 psi. These characteristics are provided merely for exemplary purposes, and are not intended to limit the application of the present invention.

The pilot operated latching coil valve 10 of the present invention is energy efficient in that only a momentary pulse of voltage needs to be applied to the coil leads 20 in order to open or close the valve. Once in the opened or closed positions, the permanent magnet 94 or the coil spring 76, respectively, latches the valve (it is contemplated that the latching functions of the spring and the magnet may be reversed). The inventive valve 10 provides additional tuning means for enhancing this efficiency, by providing the mechanism (setscrew 96) for adjusting the axial position of the permanent magnet along axis 86. Accordingly, the inventive valve provides an energy efficient valve in terms of energy input required per volume of liquid flow throughput.

Assembly and adjustment of the inventive valve 10 is as follows. The plunger assembly 75 is constructed by placing the coil spring 76 into the guide tube 78. The plunger 62 is thereafter installed into the guide tube, and the entire plunger assembly is set upon the anchoring portion 64 of the diaphragm 58 at the location of flange 80. The entire plunger assembly is secured to the valve body 12 by plate 82 and fasteners 84.

The coil 88 is wound upon the bobbin 90 and covered by coil housing 18 to form the coil assembly 87. Permanent magnet 94 is placed into the central cavity 112 of the bobbin. The coil assembly with the magnet 94 disposed therein is slipped into the C-shaped bracket 22 and fixed thereto by press fitting the pole piece 92 into an aligned opening 114 of the C-shaped bracket and into the central cavity 112 of the bobbin. The bracket 22 is then secured to the valve body 12 using fastener 24.

The setscrew 96 may then be installed into the threads 100 of the C-shaped bracket and moved into close proximity of the permanent magnet 94 so as to cause the magnetic force of the magnet to draw it into contact with the setscrew 96. The axial position of the magnet 94 may then be adjusted for desired operating conditions. Central cavity 112 in the bobbin provides space between the top end 108 of the guide tube 78 and the magnet 94 for adjustment purposes. For example, the position of the magnet may be adjusted so that the valve closes upon application to the coil leads of a voltage pulse (6–9 volts DC) for only 50 milliseconds (msec) and opens upon application of a voltage pulse (of similar magnitude but opposite polarity) for 30 msec. Of course, the magnet position may be adjusted for other desired operating conditions. The final position of the setscrew 96 is then fixed using locking nut 98.

Accordingly, a preferred embodiment of a pilot operated latching control valve has been described. With the foregoing description in mind, however, it is understood that this description is made only by way of example, that the invention is not limited to the particular embodiments described herein, and that various rearrangements, modifications, and substitutions may be implemented with respect to the foregoing description without departing from the scope of the invention as defined by the following claims and their equivalents.

We claim:

1. A latching coil valve device, comprising:

a body providing an inlet and an outlet;

an actuatable valve unit connecting said inlet to said outlet, said actuatable valve unit assuming an open position wherein said inlet and said outlet are in fluid communication and a closed position wherein said inlet and said outlet are not in fluid communication, said valve unit comprising (i) a solenoid and (ii) a valve comprising a primary valve member and a pilot valve member; and latching mechanisms for latching said actuatable valve unit in said open or closed positions, respectively at least one of said latching mechanisms being calibratable.

2. The latching coil valve assembly of claim 1, wherein one of said latching mechanisms for latching said actuatable valve unit in said open or closed positions comprises a magnet, said magnet exerting a magnetic force on said actuatable valve unit, said magnetic force exerted on said actuatable valve unit being manually calibratable to increase or decrease said force on said actuatable valve unit.

3. The latching coil valve assembly of claim 2, wherein said solenoid comprises a coil assembly surrounding a plunger assembly, said plunger assembly including a plunger extending along an axis, further comprising an adjustment mechanism for adjusting the position of said magnet with respect to said plunger.

4. The latching coil valve assembly of claim 3, wherein said adjustment mechanism comprises a threaded setscrew to which said magnet is attached.

5. The latching coil valve assembly of claim 1, further comprising a filter screen disposed within a fluid path of said inlet.

6. The latching coil valve assembly of claim 1, wherein said body is comprised of brass.

7. The latching coil valve assembly of claim 1, wherein said body is comprised of a thermoplastic material.

8. A latching coil valve device, comprising:

a body providing an inlet and an outlet;

an actuatable valve unit connecting said inlet to said outlet, said actuatable valve unit assuming an open position wherein said inlet and said outlet are in fluid communication and a closed position wherein said inlet and said outlet are not in fluid communication, said valve unit comprising (i) a solenoid comprising a coil and a plunger and (ii) a valve actuated by said solenoid;

latching mechanisms for latching said actuatable valve unit in said open or closed positions, respectively; and an adjustment mechanism associated with one of said latching mechanisms for adjusting the position of said one of said latching mechanisms with respect to said plunger.

9. The latching coil valve assembly of claim 8, wherein said valve comprises a primary valve member and a pilot valve member.

10. The latching coil valve assembly of claim 8, wherein said one of said latching mechanisms for latching said actuatable valve unit in said open or closed positions comprises a magnet.

11. The latching coil valve assembly of claim 10, wherein said adjustment mechanism comprises a threaded setscrew to which said magnet is attached.

12. The latching coil valve assembly of claim 8, further comprising a filter screen disposed within a fluid path of said inlet.

13. The latching coil valve assembly of claim 8, wherein said body is comprised of brass.

14. The latching coil valve assembly of claim 8, wherein said body is comprised of a thermoplastic material.

15. A method of adjusting a solenoid actuated latching valve, wherein the solenoid comprises a coil of wire wound about a bobbin which provides a central cavity through which a plunger moves, and wherein the valve latches into open and closed positions upon being momentarily actuated by energizing said solenoid, said method comprising the steps of:

(i) installing a permanent magnet within said central cavity;

(ii) installing within said bobbin an adjustment mechanism within proximity of said permanent magnet to cause said permanent magnet to attach to said adjustment mechanism; and (iii) adjusting within said bobbin said adjustment mechanism to adjust the position of the permanent magnet with respect to the plunger.

16. The method of claim 15, wherein said adjustment mechanism is a setscrew, and wherein said setscrew and said bobbin are provided with complementary threads.

17. The method of claim 16, wherein the setscrew is adjusted based on the characteristics of a voltage pulse applied to the solenoid coil to open and close the valve.

18. The method of claim 16, further comprising the step of locking the adjusted position of said setscrew using a locking nut.

* * * * *